United States Patent
Newcomb et al.

(10) Patent No.: US 11,420,683 B2
(45) Date of Patent: Aug. 23, 2022

(54) FIBER-REINFORCED POLYMER COMPOSITE COMPONENTS FOR VEHICLE BODY STRUCTURES AND METHODS OF MAKING THE SAME

(71) Applicant: GM GLOBAL TECHNOLOGY OPERATIONS LLC, Detroit, MI (US)

(72) Inventors: Bradley A. Newcomb, Troy, MI (US); Julien P. Mourou, Bloomfield Hills, MI (US); Giles D. Bryer, Northville, MI (US); Joung Min Choi, Rochester Hills, MI (US); Thomas S. Prevost, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 17/152,965

(22) Filed: Jan. 20, 2021

(65) Prior Publication Data
US 2022/0227425 A1    Jul. 21, 2022

(51) Int. Cl.
*B62D 25/06*    (2006.01)
*B62D 65/02*    (2006.01)
(Continued)

(52) U.S. Cl.
CPC ........... *B62D 25/06* (2013.01); *B62D 29/043* (2013.01); *B62D 65/024* (2013.01); *B62D 27/023* (2013.01)

(58) Field of Classification Search
CPC ...... B62D 25/06; B62D 29/04; B62D 29/043; B62D 29/048; B62D 65/02; B62D 65/024; B62D 20/00; B62D 27/023
(Continued)

(56) References Cited

U.S. PATENT DOCUMENTS

| 4,159,144 A | 6/1979 | Ehlen et al. |
| 4,892,351 A | 1/1990 | Ono et al. |

(Continued)

FOREIGN PATENT DOCUMENTS

| JP | 06001262 A | * | 1/1994 | ............ B62D 25/06 |
| JP | 2005067444 A | * | 3/2005 | |

(Continued)

OTHER PUBLICATIONS

Fukushima, "Upper Body Structure of Vehicle", Dec. 20, 2011, Japan Patent Office, Edition: JP2011207337A (Year: 2011).*

(Continued)

*Primary Examiner* — Dennis H Pedder
*Assistant Examiner* — Joyce Eileen Hill
(74) *Attorney, Agent, or Firm* — Quinn IP Law

(57) ABSTRACT

Presented are fiber-reinforced polymer (FRP) composite components for vehicle body structures, methods for making/using such components, and motor vehicles equipped with such components. A vehicle body structure includes one or more elongated support rails (e.g., a pair of lateral roof rails) each with an inner contoured rail panel joined to an outer contoured rail panel to define an internal rail cavity. One or more elongated support pillars (e.g., front, side, and/or back vehicle pillars) adjoin the support rail(s) and each includes an inner contoured pillar panel joined to an outer contoured pillar panel to define an internal pillar cavity coupled to the internal rail cavity. One or both contoured pillar panels and one or both contoured rail panels is/are formed, in whole or in part, from an FRP material. A structural reinforcement insert may be located inside the adjoined pillar and rail, filling a discrete region within the internal cavities.

20 Claims, 3 Drawing Sheets

(51) Int. Cl.
*B62D 29/04* (2006.01)
*B62D 27/02* (2006.01)

(58) Field of Classification Search
USPC .......... 296/210, 187, 188, 189, 193, 193.06, 296/203.03, 900, 901.01, FOR. 111, 296/FOR. 112, FOR. 113, FOR. 114
See application file for complete search history.

(56) References Cited

U.S. PATENT DOCUMENTS

| | | |
|---|---|---|
| 4,988,142 A | 1/1991 | Chandler et al. |
| 8,376,426 B2 | 2/2013 | Choi et al. |
| 8,511,742 B2 | 8/2013 | Legler et al. |
| 8,814,258 B2 | 8/2014 | Comfort et al. |
| 8,925,286 B2 | 1/2015 | Hagen et al. |
| 8,926,004 B2 | 1/2015 | Betzen et al. |
| 9,227,673 B2 | 1/2016 | Berger et al. |
| 9,290,084 B2 | 3/2016 | Bojanowski et al. |
| 9,340,096 B2 | 5/2016 | Bojanowski |
| 9,994,091 B2 | 6/2018 | Kaphengst et al. |
| 10,293,668 B1 | 5/2019 | Foss et al. |
| 2007/0182217 A1 | 8/2007 | Saleen et al. |
| 2011/0248525 A1 | 10/2011 | Lundstroem |
| 2014/0203592 A1* | 7/2014 | Nagwanshi ............ B62D 25/00 293/121 |
| 2016/0297437 A1* | 10/2016 | Hara ...................... G01S 7/4813 |
| 2017/0137066 A1* | 5/2017 | Ayuzawa .............. B62D 21/157 |
| 2019/0146216 A1 | 5/2019 | Mourou et al. |

FOREIGN PATENT DOCUMENTS

| | | | |
|---|---|---|---|
| JP | 2011207337 A * | 10/2011 | ............. B62D 25/04 |
| JP | 6308427 B2 * | 4/2018 | ............. B62D 21/00 |

OTHER PUBLICATIONS

Yoda, "Bonding Structure Between Roof Paneland Side Panel in Vehicle", Mar. 17, 2005, Japan Patent Office, Edition: JP2005067444A (Year: 2005).*

Komatsu, "Body Structure", Apr. 18, 2018, Japan Patent Office, Edition: JP6308427B (Year: 2018).*

Atsushi, "Body Skeleton Member Connecting Structure", Jan. 11, 1994, Japan Patent Office, Edition: JP06001262A (Year: 1994).*

* cited by examiner

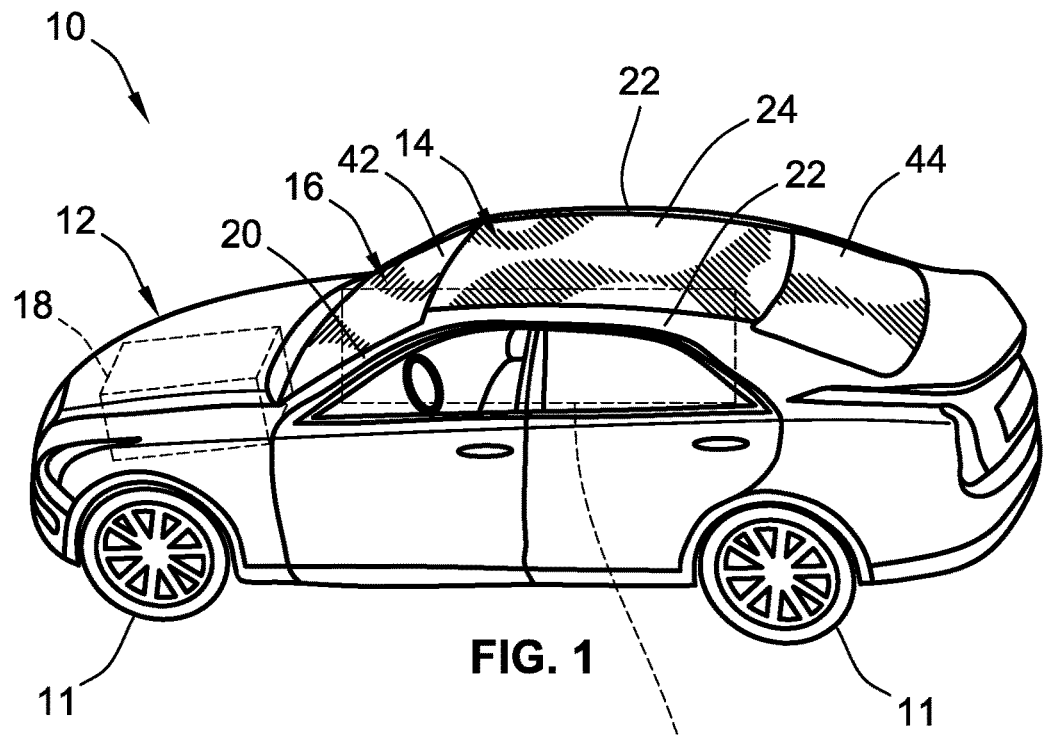
FIG. 1
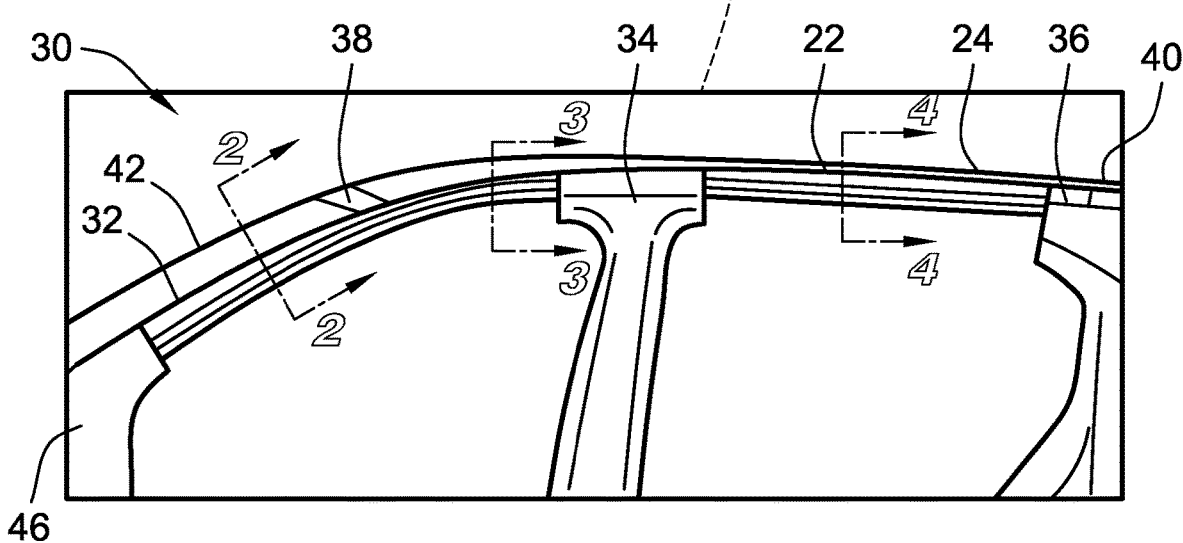

FIBER-REINFORCED POLYMER COMPOSITE COMPONENTS FOR VEHICLE BODY STRUCTURES AND METHODS OF MAKING THE SAME

INTRODUCTION

The present disclosure relates generally to load-bearing body structures of motor vehicles. More specifically, aspects of this disclosure relate to polymer composite vehicle pillars and roof rails for improved loading and roof-crush performance.

Most current production motor vehicles, such as the modern-day automobile, are erected on a rigid vehicle body—either as a body-on-frame or a unibody construction—with an interior passenger compartment that seats and safeguards the vehicle occupants. Mounted between the forward A-pillars of the vehicle body is a windshield that provides an aerodynamically formed window through which the driver views the roadway while preventing unwanted ingress of wind, rain, and debris. Driver-side and passenger-side door assemblies are movably mounted between the A and B-pillars (coupes) and B and C-pillars (sedans) to provide controlled access to the passenger compartment and enable lateral visibility through accompanying door windows. A rear window or back glass is mounted between the C-pillars (three-box body designs) or D-pillars (two-box body designs) to seal off, yet provide visibility through, a rearward end of the passenger compartment. To provide extra sunlight and optional ventilation for the passenger compartment, a moonroof or sunroof assembly may be installed within the vehicle's roof structure, e.g., supported by the front and rear roof headers and lateral roof rails.

SUMMARY

Presented herein are fiber-reinforced polymer (FRP) composite components for vehicle body structures, methods for making and methods for using such components, and motor vehicles with unitary carbon-fiber polymer (CFP) composite pillars and roof rails. By way of example, a vehicle upper body structure is generally typified by a load-bearing roof structure mounted on a pillar array that provides subjacent support between the roof and a lower body portion of the vehicle. The pillar array includes a pair of front (A) pillars at a forward end of the passenger compartment, a pair of rear (C) pillars at a rearward end of the passenger compartment and, depending on vehicle body type, a pair of side (B) pillars interposed between the A and C-pillars. The roof structure is generally composed of laterally spaced roof side rails adjoining top ends of the pillars, and longitudinally spaced front and rear headers defining the upper extents of front and rear windshield frames. Opposing ends of the roof headers may be mounted to flanges or inboard surfaces of the roof side rails to cooperatively define a roof frame with a central opening. A transparent laminate composite roof panel may be mounted onto the roof frame to cover the central opening, e.g., for a panoramic "glass roof" automobile.

Continuing with the preceding discussion of the representative vehicle upper body structure, each A-pillar may be fabricated as a bipartite construction from contoured FRP inner and outer panel pieces that are joined together, e.g., via welding, clamping, fastening, etc., to define a longitudinally elongated interior cavity. Each roof rail may be fabricated as a tripartite construction with the same two FRP panel pieces joined to a third contoured FRP panel piece that is located inboard from the inner and outer panel pieces. In a more specific example, each A-pillar is integrally formed with a respective roof rail from at least two interconnected thermoset carbon-fiber polymer composite panels. The lateral width of a third CFP composite panel, which is used to form the roof rail section, varies (e.g., increases then decreases) along the fore-aft length of the vehicle body. A mounting flange of the second CFP panel, to which the third CFP panel is joined, has a lateral width that similarly varies along the fore-aft length of the vehicle body. The A-pillar's internal cavity is connected to the roof rail's internal cavity and wholly or partially filled with an expanding polymer-foam filler or a honeycomb core insert.

Attendant benefits for at least some of the disclosed concepts include fiber-reinforced composite components of vehicle body structures that exhibit improved noise, vibration, and harshness (NVH) performance. For automotive applications, unitary FRP A-pillar and roof-rail constructions help to increase occupant visibility by maximizing a total area of a daylight opening (DLO) through a transparent roof panel mounted onto the vehicle's upper body structure. Hollow vehicle pillars and roof rails having selectively located internal reinforcement features provide local stiffening with limited additional vehicle mass to enable loading in a desired plane for optimal roof-crush performance. In addition to improving vehicle body integrity and NVH characteristics, disclosed features may also help to reduce overall vehicle mass by decreasing support upper body mass and, optionally, eliminating cross-car reinforcement bows, which in turn leads to improved fuel economy and increased vehicle range for HEV and FEV applications.

Aspects of this disclosure are directed to FRP components for vehicle body structures. In an example, a vehicle body structure for a motor vehicle includes one or more elongated support rails (e.g., a pair of lateral roof rails) and one or more elongated support pillars (e.g., vertical or diagonal front, side, and/or back vehicle pillars) adjoining the support rail(s). Each support rail includes an inner (first) contoured rail panel joined to an outer (second) contoured rail panel to define therebetween an internal rail cavity. Likewise, each support pillar includes an inner (first) contoured pillar panel joined to an outer (second) contoured pillar panel to define therebetween an internal pillar cavity. The internal pillar cavity is coupled to the internal rail cavity, e.g., to collectively define a continuous channel that extends through the support pillar and support rail. One or both of the contoured rail panels is formed, in whole or in part, from a first FRP material. In the same vein, one or both of the contoured pillar panels is formed, in whole or in part, from a second FRP material, which may be the same as or distinct from the first FRP material.

Additional aspects of this disclosure are directed to motor vehicles assembled with load-bearing upper body structures having locally reinforced, CFP-composite pillars and roof rails. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, electric bicycles ("ebikes"), etc. In an example, a motor vehicle includes a vehicle body with upper and lower body structures defining a passenger compartment, multiple road wheels mounted to the vehicle body, and other standard original equipment. A prime mover, which may be in the nature of an engine assembly (e.g., for internal combustion engine (ICE) powertrains), an electric traction motor (e.g., for full-electric vehicle (FEV) powertrains), or both an engine assembly and a traction motor (e.g., for hybrid electric vehicle (HEV) powertrains), selectively drives one or more of the road wheels to thereby propel the vehicle.

Continuing with the discussion of the above example, the vehicle also includes a rigid upper body structure with a pair of elongated roof rails that extends longitudinally along a fore-aft length of the vehicle and buttresses thereon a roof panel. Each roof rail includes a pair of contoured rail panels joined together to form an internal rail cavity. A pair of elongated support pillars projects downwardly from and adjoins the roof rails to define a window frame for a front, rear, or side vehicle window. Each support pillar includes a pair of contoured pillar panels joined together to form an internal pillar cavity. Each of the pillar cavities is coupled to a respective rail cavity, e.g., to collectively form a continuous channel that extends from the support pillar into the support rail. One or both of the contoured rail panels is formed, in whole or in part, from an FRP material, and one or both of the contoured pillar panels is formed, in whole or in part, from an FRP material, which may be the same as or distinct from the rail-panel FRP material.

Aspects of this disclosure are also directed to manufacturing systems and methods for making any of the disclosed FRP vehicle body components, load-bearing vehicle body structures, and/or motor vehicles. In an example, a method is presented for manufacturing a vehicle body structure for a motor vehicle. This representative method includes, in any order and in any combination with any of the above and below disclosed options and features: forming an elongated support rail by joining a first contoured rail panel to a second contoured rail panel to define therebetween an internal rail cavity, the first and/or second contoured rail panels including a first fiber-reinforced polymer (FRP) material; forming an elongated support pillar by joining a first contoured pillar panel to a second contoured pillar panel to define therebetween an internal pillar cavity, the first and/or second contoured pillar panels including a second FRP material; and attaching the elongated support pillar to the elongated support rail such that the internal rail cavity is coupled to the internal pillar cavity.

For any of the disclosed body structures, methods, and vehicles, the inner (first) contoured rail panel may include a pair of outwardly projecting (first) flanges, and the outer (second) contoured rail panel may include a pair of outwardly projecting (second) flanges, each of which is attached directly to a respective one of the inner (first) panel's flanges. One of the flanges of the outer (second) contoured rail panel has a longitudinal length, which extends along a fore-aft length of the vehicle body structure, and a lateral width, which varies along the vehicle body's fore-aft length. With this variable width, the internal rail cavity may have a non-uniform transverse cross-section that likewise varies along the fore-aft length of the vehicle body structure.

For any of the disclosed body structures, methods, and vehicles, the inner (first) contoured rail panel and the inner (first) contoured pillar panel each includes three or more substantially flat first panel segments (e.g., four flat panel segments). Each of these panel segments is connected to and projects at an oblique angle from one or more of the other panel segments. Likewise, the outer (second) contoured rail panel and the outer (second) contoured pillar panel each includes three or more substantially flat second panel segments (e.g., five flat panel segments). Optionally, each of these panel segments is connected to and projects at an oblique angle from one or more of the other panel segments.

For any of the disclosed body structures, methods, and vehicles, each support rail may further include an interior (third) contoured rail panel that is joined along one side thereof to the inner rail panel and along an opposite side thereof to the outer rail panel. The interior contoured rail panel is formed, in whole or in part, from an FRP material that is the same as or distinct from the FRP material(s) used to form the other inner and outer panel pieces. For instance, all of the contoured rail and pillar panels may be formed from a thermoset carbon-fiber polymer composite material. Alternatively, one or more of the contoured panel pieces may be formed with a metallic material, such as stamped aluminum sheet metal. As yet a further option, the interior (third) contoured rail panel has a lateral rail width perpendicular to a longitudinal rail length; the longitudinal length extends along the fore-aft length of the vehicle body structure, whereas the lateral width changes along the body's fore-aft length.

For any of the disclosed body structures, methods, and vehicles, the inner contoured rail panel may be integrally formed with the inner contoured pillar panel as a single-piece structure, and the outer contoured rail panel may be integrally formed with the outer contoured pillar sheet as another single-piece structure. FRP composite materials may be composed of carbon fibers, glass fibers, aramid fibers, basalt fibers, etc., that are arranged unidirectionally, bidirectionally, or multi-directionally within a solidified polymeric matrix. As noted above, the motor vehicle may be an automobile with a front windshield, opposing front and rear headers, and a transparent or opaque roof panel. In this instance, the support rail is a lateral roof rail that cooperates with the front and rear headers to provide subjacent support for the roof panel. In addition, the support pillar may be an A-pillar that cooperates with the front header and a lower cowl to at least partially define a window frame that provides subjacent support for the front windshield.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 1 is an elevated, perspective-view illustration of a representative motor vehicle with a transparent roof panel mounted on an upper body structure with unitary FRP vehicle pillars and roof rails in accordance with aspects of the present disclosure.

Figure 2:
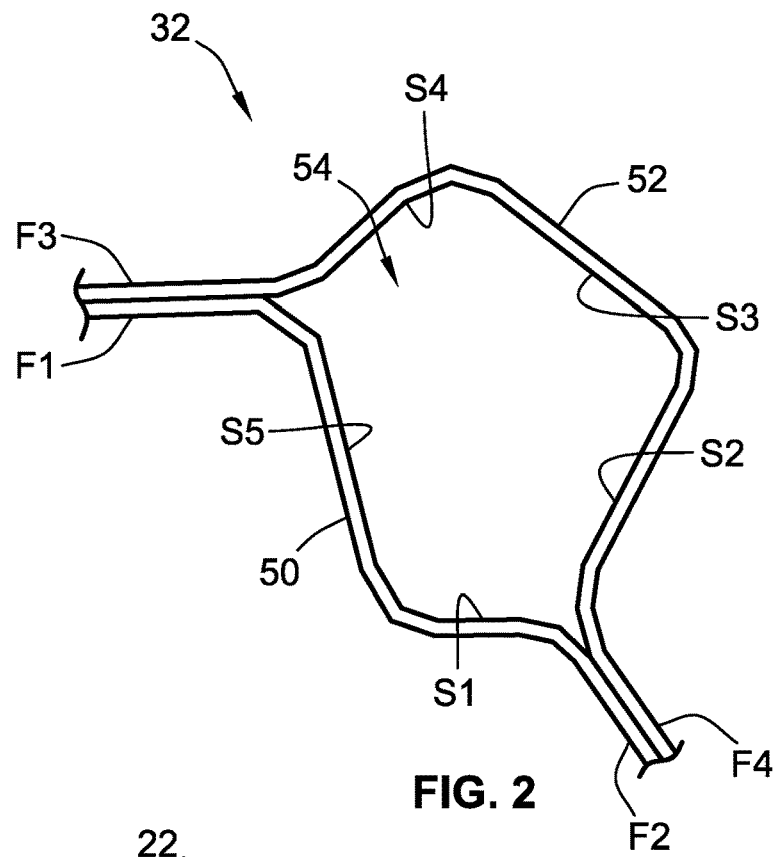
FIG. 2 is a rearward-facing, end-view illustration of a representative locally reinforced FRP A-pillar taken in cross section along line 2-2 in the inset view of FIG. 1.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style passenger vehicle with a panoramic "glass roof" assembly. The illustrated automobile 10—also referred to herein as "motor vehicle" or "vehicle" for short—is merely an exemplary application with which novel features of this disclosure may be practiced. In the same vein, incorporation of the present concepts into the A-pillars and roof rails of the vehicle's upper body structure should also be appreciated as an exemplary implementation of some of the novel concepts disclosed herein. As such, it will be understood that aspects and features of the present disclosure may be applied to other vehicle body components, may be incorporated into any logically relevant type of motor vehicle, and may be implemented for automotive and non-automotive applications alike. Moreover, only select components of the motor vehicle and vehicle body structure are shown and described in additional detail herein. Nevertheless, the vehicles and vehicle bodies discussed below may include numerous additional and alternative features, and other available peripheral components, for carrying out the various functions of this disclosure.

Automobile 10 of FIG. 1 includes a vehicle body 12 that is erected on a rigid vehicle frame 20, for example, as either a body-on-frame or a unibody construction in a three-box configuration. Front and rear road wheels 11 are operatively attached to the vehicle frame 20, e.g., via individual corner assemblies. In order to propel the vehicle, the road wheels 11 are driven by a prime mover 18, which may be in the nature of an internal combustion engine assembly and/or one or more electric traction motors. Located aft of a forward compartment (e.g., engine bay) and forward of a rear compartment (e.g., vehicle trunk) is an interior passenger compartment 16 of the vehicle body 12 that seats and safeguards the vehicle occupants. While shown as a sedan-type passenger vehicle with a three-box configuration, it should be appreciated that the vehicle 10 may take on innumerable vehicle types and vehicle-body configurations.

A rigid roof structure 14 generally delimits the upper extent of the passenger compartment 16, shielding the driver and passengers from rain, snow, ultraviolet (UV) light, and other elements. In accord with the illustrated example, the roof structure 14 is generally composed of laterally spaced roof rails 22 that are interconnected with longitudinally spaced roof headers 38 and 40 (see inset view). The roof rails 22 and roof headers 38, 40 cooperatively provide subjacent support for a roof panel 24, which may be optically transparent, translucent, opaque, or combinations thereof. The roof structure 14, including the rails 22, headers 38, 40, and roof panel 24, extends over and across the upper boundary of the passenger compartment 16. As illustrated, the transparent roof panel 24 has a "panoramic" design in that it spans across the entire fore-aft length of the vehicle roof and, thus, provides vehicle occupants with a predominantly unobstructed view through the top of the vehicle 10.

Inset within FIG. 1 is an enlarged, side-view illustration of a driver-side portion of the vehicle passenger compartment 16 shown with the vehicle doors removed to provide a more detailed look at a section of the vehicle's load-bearing upper body structure 30. The upper body structure 30 is represented in FIG. 1 by a rearwardly projecting front (A) pillar 32 at a forward end of the passenger compartment 16, a forward-leaning rear (C) pillar 36 at a rearward end of the passenger compartment 16, and a generally vertical side (B) pillar 34 interposed between the A-pillar 32 and C-pillar 36. Although not visible in the views provided, each pillar 32, 34, 36 includes a mirrored counterpart that is located on the starboard side of the vehicle passenger compartment 16 such that the body structure 30 includes six support pillars. These vehicle pillars 32, 34, 36 buttress roof structure 14 on a lower body portion of the vehicle 10 (e.g., rockers, hinge pillars, bulkhead, quarter panels, etc.). Alternative vehicle body architectures may eliminate the B-pillars 34 (e.g., for coupe-style passenger vehicles) or may include multiple side pillars (e.g., B1, B2, etc., for limousines) or a D-pillar (e.g., for sport utility vehicles and station wagons).

In addition to the rectangular array of support pillars 32, 34, 36, the upper body structure 30 of FIG. 1 is further typified by laterally spaced roof rails 22 and longitudinally spaced headers 38 and 40. The roof rails 22 are located on port and starboard sides of the passenger compartment 16 and longitudinally elongated along the fore-aft length of the vehicle 10. Located at forward and rearward ends of the roof structure 14 are the front and rear headers 38 and 40, respectively, which extend transversely across the lateral width of the roof 14. Optional cross-car reinforcement bows (not shown) may be included for supporting a standard roof panel or, conversely, may be eliminated from the roof structure 14 for supporting a panoramic "glass roof" panel. The front header 38 cooperates with the two A-pillars 32 and a front cowl panel (not shown) to define a front window frame that operatively supports thereon a front windshield 42. At the opposite end of the passenger compartment 16, the rear header 40 cooperates with the two C-pillars 36 and a rear deck panel (not shown) to define a rear window frame that operatively supports thereon a rear windshield 44.

To improve vehicle noise and vibration performance while optimizing roof-crush performance of the automobile 10, the upper body structure 30 may be manufactured with hollow FRP-composite components that are structurally reinforced with localized polymer foam or honeycomb core inserts. FIG. 2, for example, provides an end-view illustration of one of the A-pillars 32 taken in cross-section along line 2-2 in the inset view of FIG. 1. A-pillar 32 (also referred to herein as "support pillar") is assembled from two discrete non-flat pieces: an inner contoured panel 50 (also referred to herein as "first contoured pillar panel"); and an outer contoured panel 52 (also referred to herein as "second contoured pillar panel") located outboard from the inner contoured panel 50. Opposing sides of the elongated contoured panels 50, 52 are joined together to define therebetween a five-sided internal cavity 54 (also referred to herein as "internal pillar cavity"). Both contoured panels 50, 52 may be molded from a fiber-reinforced polymer (FRP) composite material, cut and stamped from a steel or aluminum sheet metal, or fabricated from other suitably rigid materials and processes. Although depicted as a two-piece construction, the A-pillar 32 may be manufactured as a one-piece tubular structure with a similarly shaped polygonal cross-section.

Figure 3:
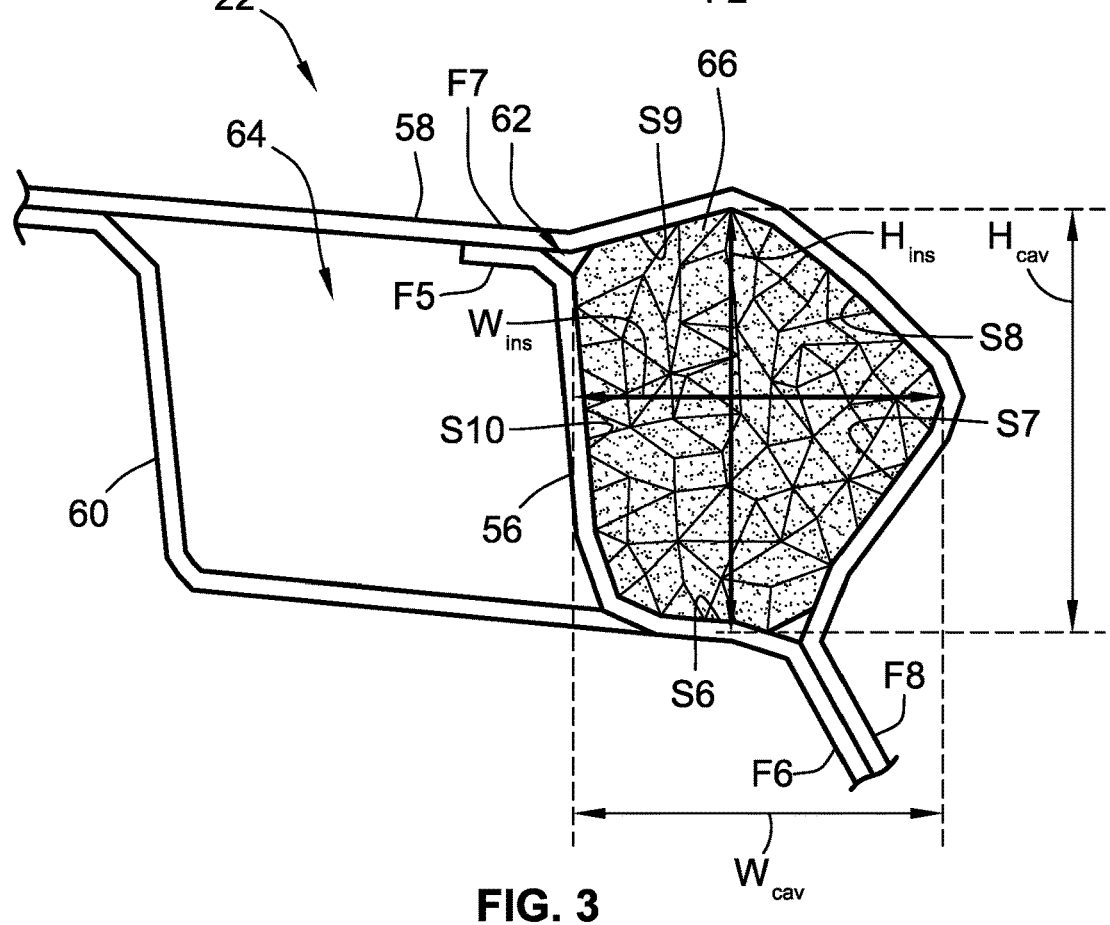
FIG. 3 is a rearward-facing, end-view illustration of a representative locally reinforced FRP roof rail taken in cross section along line 3-3 in the inset view of FIG. 1.

FIG. 3 presents an end-view illustration of one of the roof rails 22 taken in cross-section along line 3-3 in the inset view of FIG. 1. Roof rail 22 (also referred to herein as "support rail") is assembled from three discrete non-flat pieces: an inner contoured panel 56 (also referred to herein as "first contoured rail panel"); an outer contoured panel 58 (also referred to herein as "second contoured rail panel") located outboard from the inner contoured panel 56; and an interior contoured panel 60 (also referred to herein as "third contoured rail panel") located inboard from the inner contoured panel 56. Opposing lateral sides of the elongated inner and outer contoured panels 56, 58 are joined together to define therebetween a five-sided main internal cavity 62 (also referred to herein as "internal rail cavity"). Likewise, opposing lateral sides of the interior panel 60 are joined to the inner and outer rail panels 56, 58 to define a four-sided secondary internal cavity 64 neighboring the main internal cavity 62. Similar to the panels 50, 52 of FIG. 2, the three contoured panels 56, 58, 60 of FIG. 3 may be fabricated from an FRP-composite material, a metallic material, or other suitable load-bearing material. Also comparable to the A-pillar 32, the roof rail 22 may be fabricated as a one, two, or three-piece construction or may include greater than the three discrete pieces portrayed in FIG. 3. What's more, the pillar 32 and rail 22 may take on other cross-section geometries and alternative dimensions.

A forward-facing end of the roof rail 22 adjoins a rearward-facing end of the A-pillar 32 such that the internal panel cavity 54 couples to the internal rail cavity 62. For applications in which roof rails 22 and A-pillars 32 are FRP-composite constructions, the inner contoured panel 50 of the A-pillar 32 may be integrally formed with the inner contoured panel 56 of the roof rail 22 as a unitary, single-piece structure. Similarly, the outer contoured panel 52 of the A-pillar 32 may be integrally formed with the outer contoured panel 58 of the roof rail 22 as a unitary, single-piece structure. In so doing, internal cavities 54, 62 may collectively fashion a continuous channel that extends the entire length of the roof rail 22 and A-pillar 32. Although described herein with respect to vehicle pillars 32, 34, 36 and roof rails 22 of a vehicle upper body structure 30, it should be appreciated that many of the related features and options of this disclosure may be applied to other vehicle components at other vehicle locations.

Located inside the A-pillar 32 and roof rail 22 is an optional structural reinforcement insert 66 that is confined to and fills a discrete region within the internal cavities 54, 62. This localized reinforcement insert 66 may originate at an aftward end of the A-pillar within the internal cavity 54, extend rearward through an intersection corner of the body structure 30 at which the A-pillar 32, roof rail 22, and front header 38 intersect, and terminate within the main cavity 62 of the roof rail 22 approximately halfway between the A-pillar 32 and B-pillar 34. Accordingly, a fore-aft region length of the discrete region filled by the structural reinforcement insert 66 is less than a combined fore-aft length of the A-pillar length and roof rail length. It should be appreciated, however, that the location and length of the discrete region filled by the insert 66 may be modified without departing from the intended scope of this disclosure.

Each localized reinforcement insert 66, while restricted to an isolated length of the adjoined A-pillar 32 and roof rail 22, has sufficient girth to fill the discretized section or sections of the internal cavity 54 and main cavity 62 occupied by the insert 66. With reference back to FIG. 3, the structural reinforcement insert 66 has a lateral insert width $W_{ins}$ and a vertical insert height $H_{ins}$ that are substantially equal to a lateral cavity width $W_{cav}$ and a vertical cavity height $H_{cav}$, respectively, of the discrete region $V_{reg}$ within the internal cavities 54, 62. With these complementary dimensions, the reinforcement insert 66 occludes the internal cavities 54, 62 of the A-pillar 32 and roof rail 22. In this regard, the outermost periphery of the discrete region $V_{reg}$ is delineated by multiple inward-facing surfaces of the A-pillar 32 and roof rail 22. FIG. 2, for example, labels the five inward-facing surfaces S1-S5 of the A-pillar 32, and FIG. 3 labels the five inward-facing surfaces S6-S10 of the roof rail 22. In order to fill the discrete region $V_{reg}$ within the internal and main cavity 54, 62, each of the five outward-facing surfaces (not labelled) of the structural reinforcement insert 66 is seated substantially flush against one or more inward-facing surfaces S1-S10 of the pillar 32 and rail 22. Based on the type of insert used, the structural reinforcement insert 66 may apply a substantially continuous outward pressure (i.e., expansive force) on the inward-facing surfaces S1-S10 that define the outer periphery of the discrete region $V_{reg}$. With these features, a transverse cross-section geometry of the insert 66 is substantially identical to the transverse cross-section geometry or geometries of the sections of the internal cavities 54, 62 occupied by the insert 66.

Depending on the intended application and corresponding design constraints for the locally reinforced vehicle body component, the structural reinforcement insert 66 may take on any suitable combination of shape, size, location, and orientation. For instance, the structural reinforcement insert 66 is depicted as an elongated, polyhedral shaped polymeric insert or honeycomb insert. A polymeric insert may be formed from a thermally expanding foam, an acrylonitrile butadiene styrene (ABS) material, or a polyurethane material, or any combination thereof. For at least some desired implementations, reinforcement insert 66 is formed in situ from a thermally expanding foam composed of a thermoset matrix material that expands when mixed with thermally expanding microspheres and subjected to a predefined expansion temperature. The epoxy or thermoset matrix in the expanding foam will crosslink and form a structural foam insert. Other suitable foam materials may be selected from a list comprising: ABS thermoplastic foams, polycarbonate foams, polystyrene foams, polypropylene foams, and poly(vinyl chloride) foams. A honeycomb insert may be formed from a metallic material, a paper material, a thermoplastic material, or any combination thereof. A honeycomb insert may be a solid structure with an array of hollow, columnar cells formed between a lattice of thin, interconnected walls.

Figure 4:
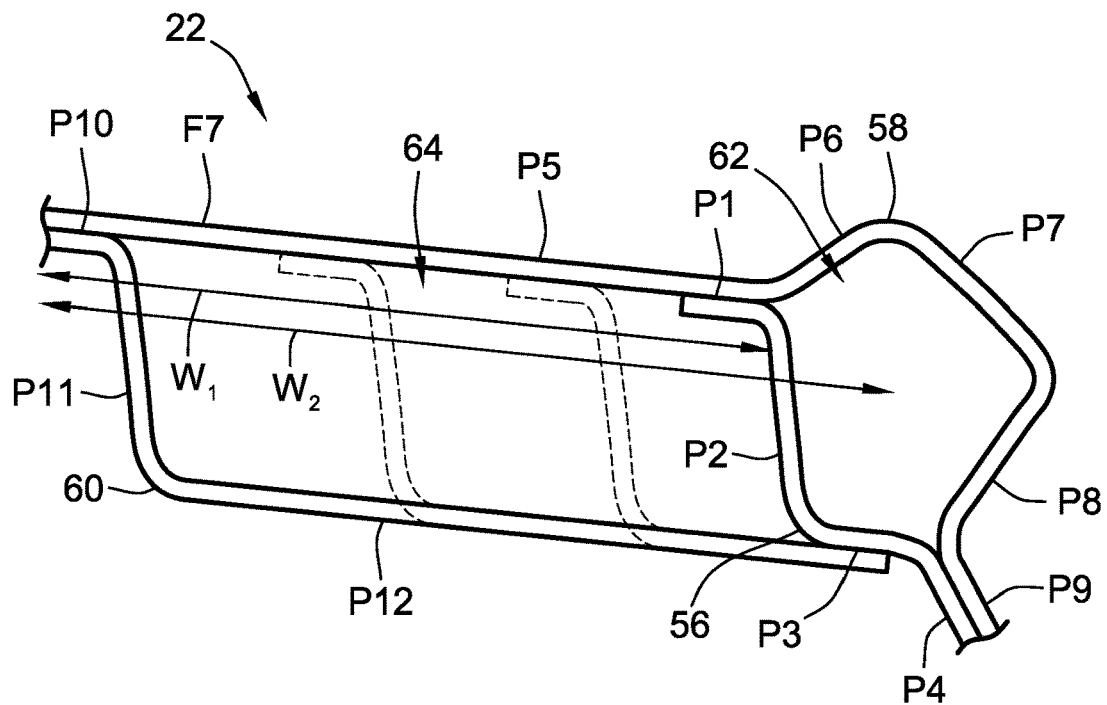
FIG. 4 is a rearward-facing, end-view illustration of the FRP roof rail taken in cross section along line 4-4 in the inset view of FIG. 1.
Figure 5:
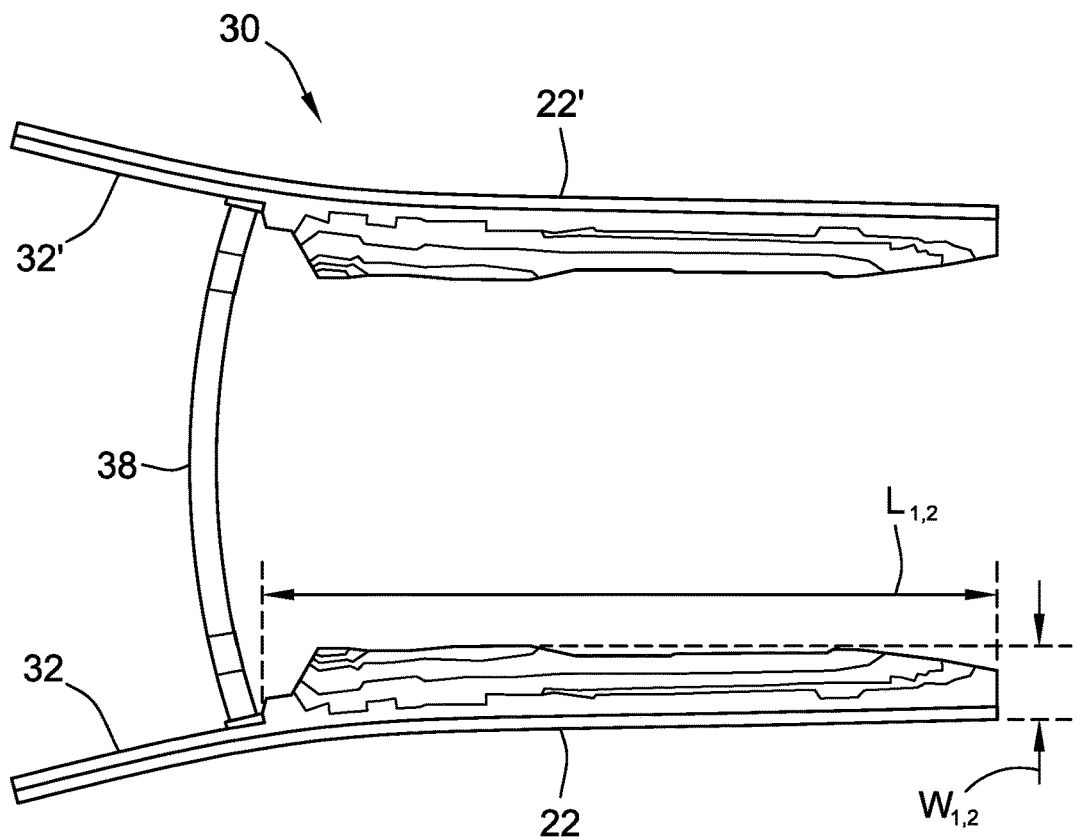
FIG. 5 is a plan-view illustration of the vehicle upper body structure of FIG. 1 with an uppermost roof panel removed to more clearly show the variable lateral widths of the contoured FRP panels defining the roof rail section of the reinforced FRP roof structure.

FIG. 5 illustrates select fiber-reinforced polymer composite components of the upper body structure 30 of automobile 10 of FIG. 1. In this example, the driver and passenger-side roof rails 22 and 22', the driver and passenger-side A-pillars 32 and 32' and the cross-car front roof header 38 are all fabricated, in whole or in part, from an FRP polymer composite material with a fiber filler embedded within a polymer matrix. The entrained fibrous material may be composed of carbon fibers, glass fibers, aramid fibers, basalt fibers, and/or any other suitable reinforcing fiber, which may be arranged unidirectionally, bidirectionally, or multi-directionally. The fiber composition may be woven or compacted, and subsequently cut into a mat or roving. The FRP composite material may optionally contain one or more additives and a protective, hard exterior coating. As a further option, the FRP material may include a fiber-weave preform that is entrained within a thermoset or thermoplastic matrix to collectively provide localized opacity or a layer-level transparency. All of the contoured rail and pillar panels 50, 52, 56, 58 and 60 of FIGS. 2-4, for example, may be formed from a thermoset carbon-fiber polymer composite material. Alternatively, the outer contoured panels 52, 58 may be formed from a metallic material, such as stamped aluminum or steel sheet metal, e.g., to facilitate assembly of the upper body structure 30 to the vehicle's lower body structure. Hollow FRP vehicle pillars, roof rails, and headers may help to provide improved NVH performance and increased local stiffening with limited added vehicle mass to enable (quasi-isotropic, unidirectional, or bidirectional) loading in a desired plane for optimal roof-crush performance.

With continuing reference to FIG. 5, the integrally formed FRP roof rails 22 and 22' and A-pillars 32 and 32' connect from the lower hinge pillars 46, just above the front cowl (not shown), and extend in an aftward direction to the rear header 40, coupling to the C-pillar 36. A single cross-car header 38 extends between and connects an intersection point between the front A-pillar 32 and 32' roof rails 22; all cross-car reinforcement bows are eliminated in this example. To help improve the structural integrity of the roof structure, the inner contoured rail and pillar panels 50, 56 are formed with at least three substantially flat (first) panel segments, such as the four panel segments P1-P4 in FIG. 4. In this instance, each panel segment P1-P4 is connected to and projects at an oblique angle from one or more of the other panel segments P1-P4. In a similar regard, the outer contoured rail and pillar panels 52, 58 are formed with at least three substantially flat (second) panel segments, represented herein by five panel segments P5-P9 of FIG. 4. Similar to panel segments P1-P4, each panel segment P5-P9 is connected to and projects at an oblique angle from one or more of the other panel segments P5-P9. The interior contoured panel 60 is also formed with at least three substantially flat (third) panel segments, represented in FIG. 4 by three panel segments P10-P12. Each of these panel segments P10-P12 is connected to and projects at an oblique angle from another panel segment P10-P12.

As noted above, opposing sides of the contoured panels 50, 52 are joined together to form the A-pillar 32 section of the upper body structure 30, and opposing sides of the contoured panels 56, 58 are joined together to form the roof rail 22 section of the upper body structure 30. In accord with the illustrated examples, the inner contoured panel 50 includes a pair of outwardly projecting (first) flanges F1 and F2 (FIG. 2), and the contoured outer panel 52 includes a pair of outwardly projecting (second) flanges F3 and F4 (FIG. 2). The inner panel's 50 upper flange F1 is coupled directly to the outer panel's 56 upper flange F3, while the inner panel's 50 lower flange F2 is coupled directly to the outer panel's 56 lower flange F4. Referencing back to FIG. 3, the inner contoured panel 56 includes a pair of outwardly projecting (third) flanges F5 and F6, and the contoured outer panel 58 includes a pair of outwardly projecting (fourth) flanges F7 and F8. The inner panel's 56 upper flange F5 is coupled directly to the outer panel's 58 upper flange F7, while the inner panel's 56 lower flange F6 is coupled directly to the outer panel's 58 lower flange F8.

To help improve transverse and vertical loading on the roof structure 14, the dimensional characteristics of select segments of the upper body structure 30 may change in the fore-aft, cross-car and/or vertical directions of the automobile 10. Collective reference to FIGS. 4 and 5, for example, shows that the upper contoured rail panel 58, namely the upper flange F7, has a lateral (flange) width $W_1$ that is perpendicular to its longitudinal (flange) length $L_1$, which is generally parallel the fore-aft length of the vehicle 10. The upper flange's F7 lateral width $W_1$ varies (e.g., increases and decreases) along the fore-aft length of the vehicle body 12. In so doing, the main rail cavity 62 has a non-uniform transverse cross-section that likewise varies (e.g., expands and contracts) along the fore-aft length of the vehicle body 12. Similar to the upper contoured rail panel 58, the interior contoured rail panel 60 has a lateral (rail) width $W_2$ that is perpendicular to its longitudinal (rail) length $L_2$, which is generally parallel the fore-aft length of the vehicle 10. The rail panel's 60 lateral width $W_2$ varies (e.g., increases and decreases) along the fore-aft length of the vehicle body 12. Consequently, the secondary rail cavity 64 has a non-uniform transverse cross-section that likewise varies along the fore-aft length of the vehicle body 12.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A vehicle body structure for a motor vehicle, the vehicle body structure comprising:
    an elongated support rail including a first contoured rail panel joined to a second contoured rail panel to define therebetween an internal rail cavity, the first and/or second contoured rail panels including a first fiber-reinforced polymer (FRP) material; and an elongated support pillar adjoining the support rail and including a first contoured pillar panel joined to a second contoured pillar panel to define therebetween an internal pillar cavity coupled to the internal rail cavity, the first and/or second contoured pillar panels including a second FRP material.

2. The vehicle body structure of claim 1, wherein the first contoured rail panel includes a pair of outwardly projecting first flanges, and the second contoured rail panel includes a pair of outwardly projecting second flanges each mounted to a respective one of the first flanges.

3. The vehicle body structure of claim 2, wherein one of the second flanges of the second contoured rail panel has a lateral flange width and a longitudinal flange length, the longitudinal flange length extending along a fore-aft length of the vehicle body structure, and the lateral flange width varying along the fore-aft length of the vehicle body structure.

4. The vehicle body structure of claim 3, wherein the internal rail cavity has a non-uniform transverse cross-section varying along the fore-aft length of the vehicle body structure.

5. The vehicle body structure of claim 1, wherein the first contoured rail panel and the first contoured pillar panel each includes at least three substantially flat first panel segments, and wherein each of the first panel segments is connected to and projects at an oblique angle from another of the first panel segments.

6. The vehicle body structure of claim 1, wherein the second contoured rail panel and the second contoured pillar panel each includes at least three substantially flat second panel segments, and wherein each of the second panel segments is connected to and projects at an oblique angle from another of the second panel segments.

7. The vehicle body structure of claim 1, wherein the support rail further includes a third contoured rail panel joined along a first side thereof to the first contoured rail panel and along a second side thereof to the second contoured rail panel, the third contoured rail panel including a third FRP material.

8. The vehicle body structure of claim 7, wherein the third contoured rail panel has a lateral rail width and a longitudinal rail length, the longitudinal rail length extending along a fore-aft length of the vehicle body structure, and the lateral rail width varying along the fore-aft length.

9. The vehicle body structure of claim 7, wherein the first, second and third FRP materials are a thermoset carbon-fiber polymer (CFP) composite material.

10. The vehicle body structure of claim 1, wherein the motor vehicle includes a front windshield and a roof panel, wherein the vehicle body structure further comprises front and rear headers, and wherein the support rail is a roof rail cooperatively configured with the front and rear headers to buttress the roof panel, and the support pillar is an A-pillar cooperating with the front header to at least partially define a window frame configured to buttress the front windshield.

11. The vehicle body structure of claim 1, wherein the first contoured rail panel is integrally formed with the first contoured pillar panel as a first single-piece structure, and the second contoured rail panel is integrally formed with the second contoured pillar panel as a second single-piece structure.

12. The vehicle body structure of claim 1, further comprising a structural reinforcement insert located inside the support pillar and the support rail and filling a discrete region within the interconnected internal rail cavity and internal pillar cavity.

13. The vehicle body structure of claim 12, wherein the structural reinforcement insert includes an elongated polymeric-foam insert and/or an elongated honeycomb insert.

14. A motor vehicle comprising:
a vehicle body with an upper body structure adjoining a lower body structure; and
a prime mover mounted on the vehicle body and operable to propel the motor vehicle, wherein the upper body structure includes:
first and second elongated roof rails extending longitudinally along a fore-aft length of the motor vehicle and buttressing thereon a roof panel, the first and second roof rails each including a respective first contoured rail panel joined to a respective second contoured rail panel to define therebetween a respective internal rail cavity, the first and/or second contoured rail panels including a first fiber-reinforced polymer (FRP) material; and
first and second elongated support pillars projecting downwardly from and adjoining the first and second roof rails, respectively, to define a window frame, the first and second support pillars each including a respective first contoured pillar panel joined to a respective second contoured pillar panel to define therebetween a respective internal pillar cavity, wherein each of the internal pillar cavities is coupled to a respective one of the internal rail cavities, and the first and/or second contoured pillar panels including a second FRP material.

15. A method of manufacturing a vehicle body structure for a motor vehicle, the method comprising:
forming an elongated support rail by joining a first contoured rail panel to a second contoured rail panel to define therebetween an internal rail cavity, the first and/or second contoured rail panels including a first fiber-reinforced polymer (FRP) material;
forming an elongated support pillar by joining a first contoured pillar panel to a second contoured pillar panel to define therebetween an internal pillar cavity, the first and/or second contoured pillar panels including a second FRP material; and
attaching the elongated support pillar to the elongated support rail such that the internal rail cavity is coupled to the internal pillar cavity.

16. The method of claim 15, wherein the first contoured rail panel includes a pair of outwardly projecting first flanges, and the second contoured rail panel includes a pair of outwardly projecting second flanges each mounted to a respective one of the first flanges, one of the second flanges having a lateral flange width varying along a fore-aft length of the vehicle body structure.

17. The method of claim 16, the internal rail cavity has a non-uniform transverse cross-section varying along the fore-aft length of the vehicle body structure.

18. The method of claim 15, wherein the support rail further includes a third contoured rail panel joined to the first contoured rail panel and to the second contoured rail panel, the third contoured rail panel including a third FRP material, the third contoured rail panel having a lateral rail width varying along a fore-aft length of the vehicle body structure.

19. The method of claim 15, further comprising locating a structural reinforcement insert inside the support pillar and the support rail such that the structural reinforcement insert fills a discrete region within the internal rail cavity and the internal pillar cavity.

20. The method of claim 1, wherein attaching the support pillar to the support rail includes integrally forming the first contoured rail panel with the first contoured pillar panel as a first single-piece FRP structure, and integrally forming the second contoured rail panel with the second contoured pillar panel as a second single-piece FRP structure.

* * * * *